(12) United States Patent
Zhang et al.

(10) Patent No.: US 8,596,159 B2
(45) Date of Patent: Dec. 3, 2013

(54) DECELERATION MECHANISM

(75) Inventors: Guo-Qing Zhang, Shenzhen (CN); Zhi-Ming Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 822 days.

(21) Appl. No.: 12/766,010

(22) Filed: Apr. 23, 2010

(65) Prior Publication Data
US 2011/0155517 A1 Jun. 30, 2011

(30) Foreign Application Priority Data
Dec. 28, 2009 (CN) .......................... 2009 1 0312395

(51) Int. Cl.
*B25J 17/02* (2006.01)
(52) U.S. Cl.
USPC .................................. 74/490.01; 74/89.2
(58) Field of Classification Search
USPC ............. 74/490.01, 490.05, 490.06; 188/65.2
See application file for complete search history.

(56) References Cited

U.S. PATENT DOCUMENTS

| | | | | |
|---|---|---|---|---|
| 3,194,080 A | * | 7/1965 | Olson | 74/10.7 |
| 4,192,092 A | * | 3/1980 | Goldfarb et al. | 446/304 |
| 5,092,646 A | * | 3/1992 | Smallridge | 294/111 |
| 5,792,135 A | * | 8/1998 | Madhani et al. | 606/1 |
| 5,816,770 A | * | 10/1998 | Itagaki | 414/744.5 |
| 6,969,385 B2 | * | 11/2005 | Moreyra | 606/1 |
| 7,348,747 B1 | * | 3/2008 | Theobold et al. | 318/568.21 |
| 7,628,093 B2 | * | 12/2009 | Madhani et al. | 74/490.04 |
| 8,016,509 B2 | * | 9/2011 | Gao | 403/57 |
| 8,181,552 B2 | * | 5/2012 | Lee et al. | 74/490.04 |
| 2006/0207377 A1 | * | 9/2006 | Gosselin et al. | 74/490.01 |
| 2009/0320638 A1 | * | 12/2009 | Lee et al. | 74/490.04 |

FOREIGN PATENT DOCUMENTS

| | | |
|---|---|---|
| CN | 200959029 Y | 10/2007 |
| CN | 201296802 Y | 8/2009 |

* cited by examiner

*Primary Examiner* — Robert A Siconolfi
*Assistant Examiner* — James Hsiao
(74) *Attorney, Agent, or Firm* — Altis & Wispro Law Group, Inc.

(57) ABSTRACT

A deceleration mechanism includes a transmission assembly and a driving device. The transmission assembly includes a driving member, a first driven assembly, a second driven assembly, a first transmission member, and a second transmission member. The first transmission member coils around the driving member and the first driven assembly. The second transmission member coils around the first driven assembly and the second driven assembly. The driving device rotates the driving member, the driving member rotates the first driven assembly, and the first driven assembly rotates the second driven assembly.

18 Claims, 5 Drawing Sheets

DECELERATION MECHANISM

BACKGROUND

1. Technical Field

The present disclosure generally relates to robotics and, particularly, to a deceleration mechanism used in a robot.

2. Description of Related Art

Deceleration mechanisms are widely used in industrial robotics and other applications. A deceleration mechanism often includes a plurality of meshing gears of different diameters.

A commonly used deceleration mechanism includes an inner gear arranged in a shell, a crankshaft with an eccentrically rotating portion arranged in the shell, and a cycloidal gear sleeved on the eccentrically rotating portion. The cycloidal gear rotates about the eccentrically rotating portion, and not only meshes with the inner gears but also at the same time performs a revolution, thereby generating an output speed lower than the input rotating speed. However, to achieve higher meshing degree and steadier output, the cycloidal gear generally forms a plurality of gear teeth on its outer surface. When the deceleration mechanism is of a small size, if too many gear teeth are formed on the cycloidal gear, each gear tooth becomes very small, with the clearance between adjacent gear teeth also becoming very small. Thus, overlapping interference between the roots of the adjacent gear teeth may be resulted. Therefore, the cycloidal gear and the gear teeth are difficult to manufacture and present higher cost and more complicated structure.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
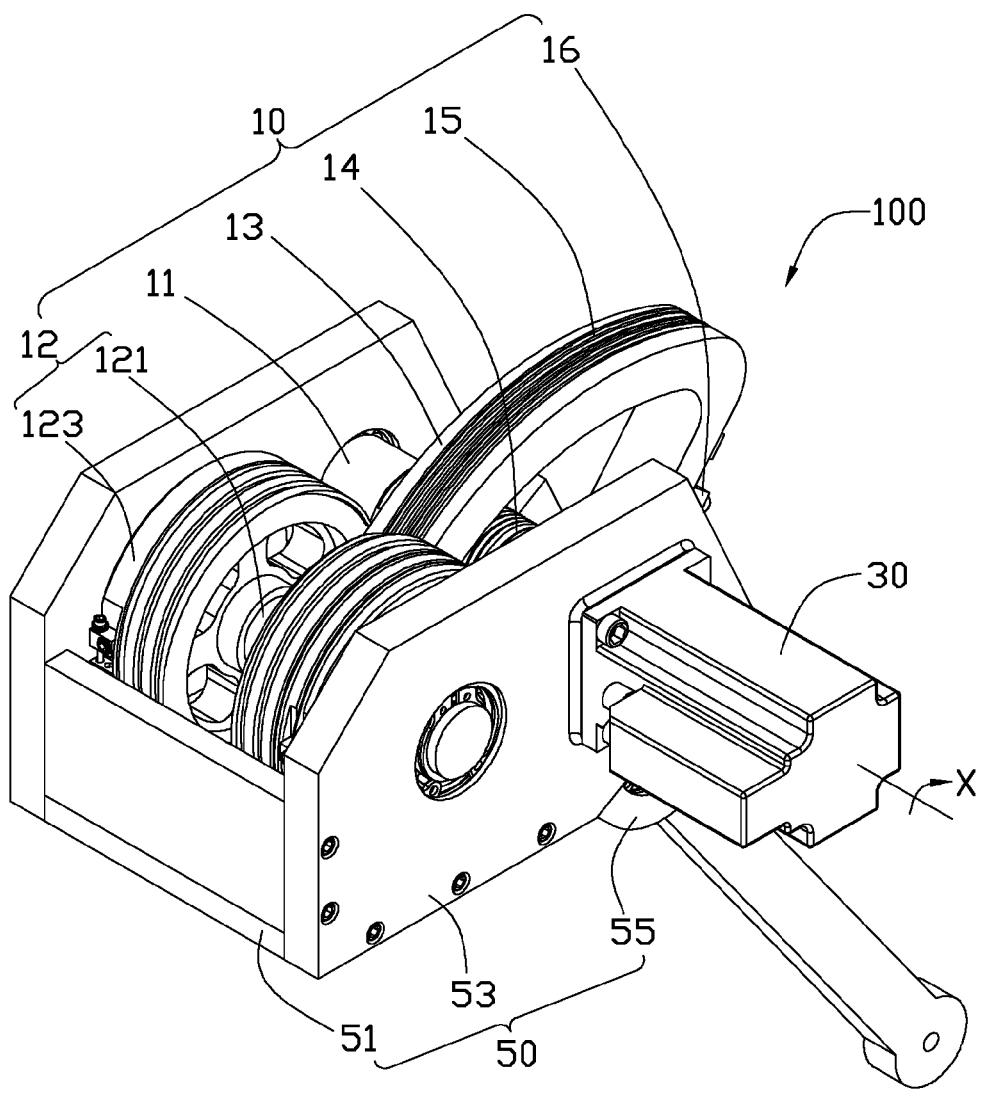
FIG. 1 is an assembled, isometric view of a deceleration mechanism as disclosed, including a driving device and a transmission assembly.

Referring to FIG. 1, a deceleration mechanism 100 used in a robot includes a transmission assembly 10, a driving device 30 driving the transmission assembly 10, and a bracket 50 supporting the transmission assembly 10.

The transmission assembly 10 includes a driving member 11, a first driven assembly 12, a second driven assembly 13, a first transmission member 14, a second transmission member 15, and four fixing assemblies 16. The driving member 11 of a cylindrical shape is connected to the driving device 30. The first transmission member 14 coils around the driving member 11 and the first driven assembly 12. The second transmission member 15 coils around the first driven assembly 12 and the second driven assembly 13. Two of the fixing assemblies 16 fixedly connect the ends of the first transmission member 14 to the first driven assembly 12, and the remaining fixing assemblies 16 fixedly connect the ends of the second transmission member 15 to the second driven assembly 13.

Figure 2:
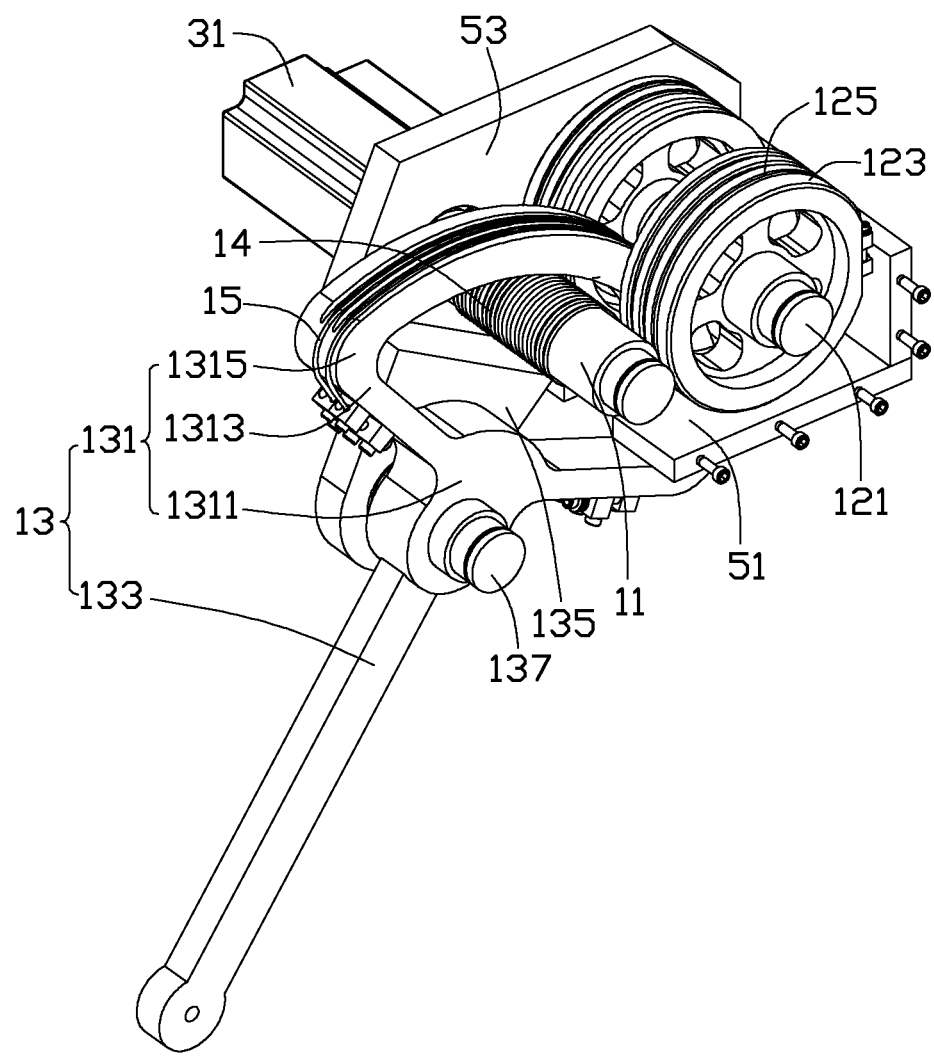
FIG. 2 is a partially assembled, isometric view of the deceleration mechanism of FIG. 1 from another aspect.

Referring to FIGS. 1 and 2, the first driven assembly 12 includes a driven shaft 121 and two driven wheels 123 arranged around the outside of the driven shaft 121. The driven wheels 123 are arranged around at the opposite sides of the driven shaft 121. Each driven wheel 123 defines a spiral receiving slot 125 with a plurality of windings. The ratio of the diameter of the driven wheel 123 and the diameter of the driving member 11 is the first stage transmission ratio of the deceleration mechanism 100.

Figure 3:
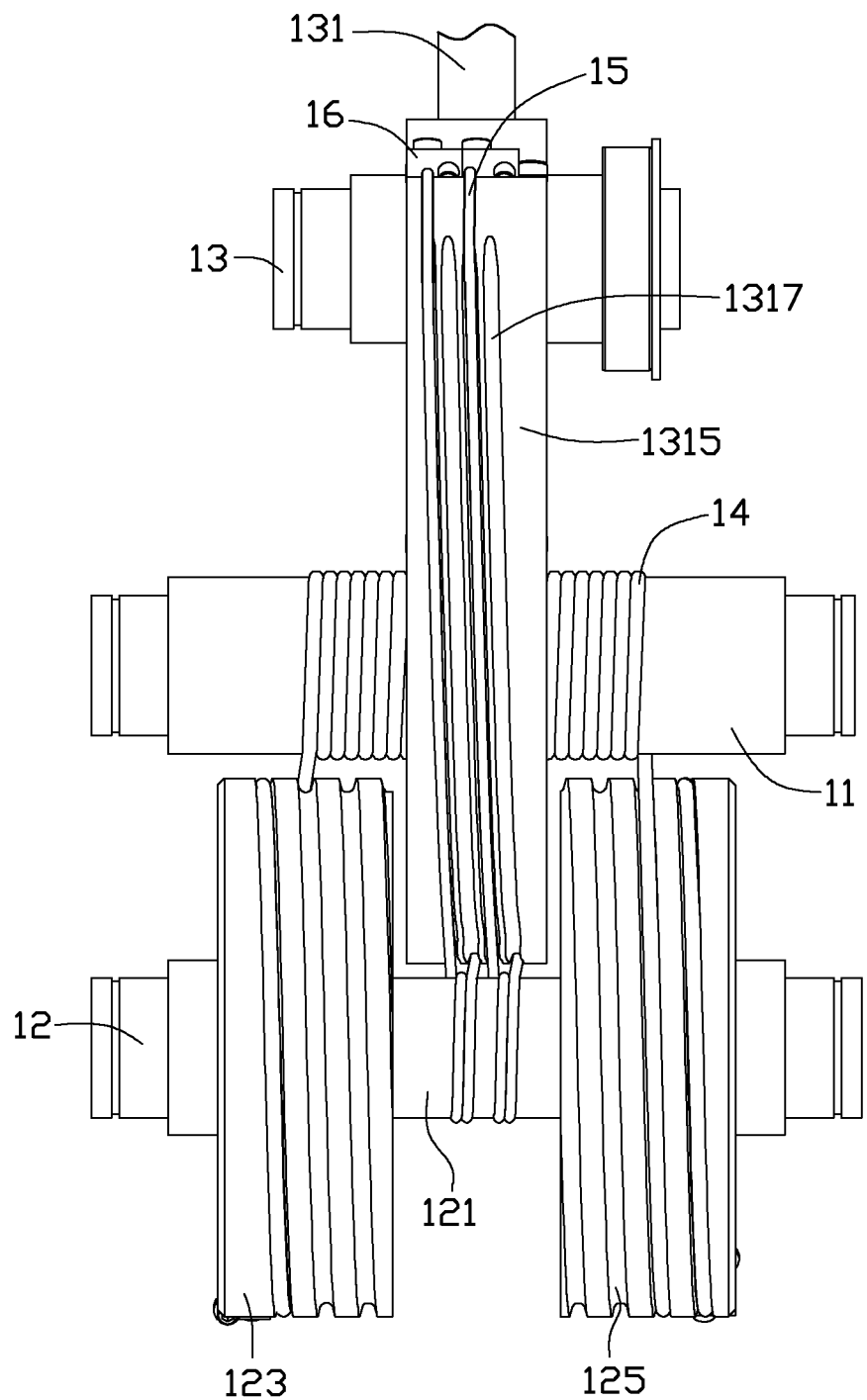
FIG. 3 is a plan view of a transmission assembly utilized by the deceleration mechanism of FIG. 1.

Referring to FIGS. 1 through 3, the second driven assembly 13 includes a transmission portion 131, a transmission rod 133 extending from one end of the transmission portion 131, and a rotating shaft 137. The second driven assembly 13 further defines a through hole 135 extending through the transmission portion 131. The transmission portion 131 is substantially fan-shaped, including a connecting end 1311, two sidewalls 1313 extending from the connecting end 1311, and a curved edge 1315 connecting the sidewalls 1313. The curved edge 1315 defines four substantially parallel receiving slots 1317 along the curve in the illustrated embodiment. The transmission rod 133 extends away from the curved edge 1315 at the connecting end 1311. The through hole 135 is defined between the curved edge 1315 and the sidewalls 1313. The rotating shaft 137 extends through the connecting end 1311 and is substantially perpendicular to the transmission rod 133. The ratio of the radius of the fan-shaped transmission portion 131 and the radius of the driven shaft 121 of the first driven assembly 12 is the second stage transmission ratio of the deceleration mechanism 100. The fan angle of the fan-shaped transmission portion 131 of the second driven assembly 13 equals the product of 360° and the ratio of the count of rotating windings of the first driven assembly 12 and the second stage transmission ratio.

The first transmission member 14 coils around on the driving member 11 and the receiving slot 125 of the driven wheel 123. The receiving slot 125 of the driven wheel 123 receiving the first transmission member 14 carries fewer windings than the receiving slot 125 has left remaining. The first transmission member 14 may be a wire cable, a steel coil, or other material of sufficient strength. In the illustrated embodiment, the first transmission member 14 is a wire cable, for providing higher transmission precision, better rigidity and steady transmission.

The second transmission member 15 coils around the driven shaft 121 of the first driven assembly 12 and the receiving slot 1317 of the second driven assembly 13. The second transmission member 15 may be a wire cable, a steel coil, or other material of sufficient strength. There may further be any number of second transmission members 15, additionally influencing strength thereof. In the illustrated embodiment, two second transmission members 15 are deployed, and are of wire cables, for providing higher transmission precision, better rigidity and steady transmission.

Figure 4:
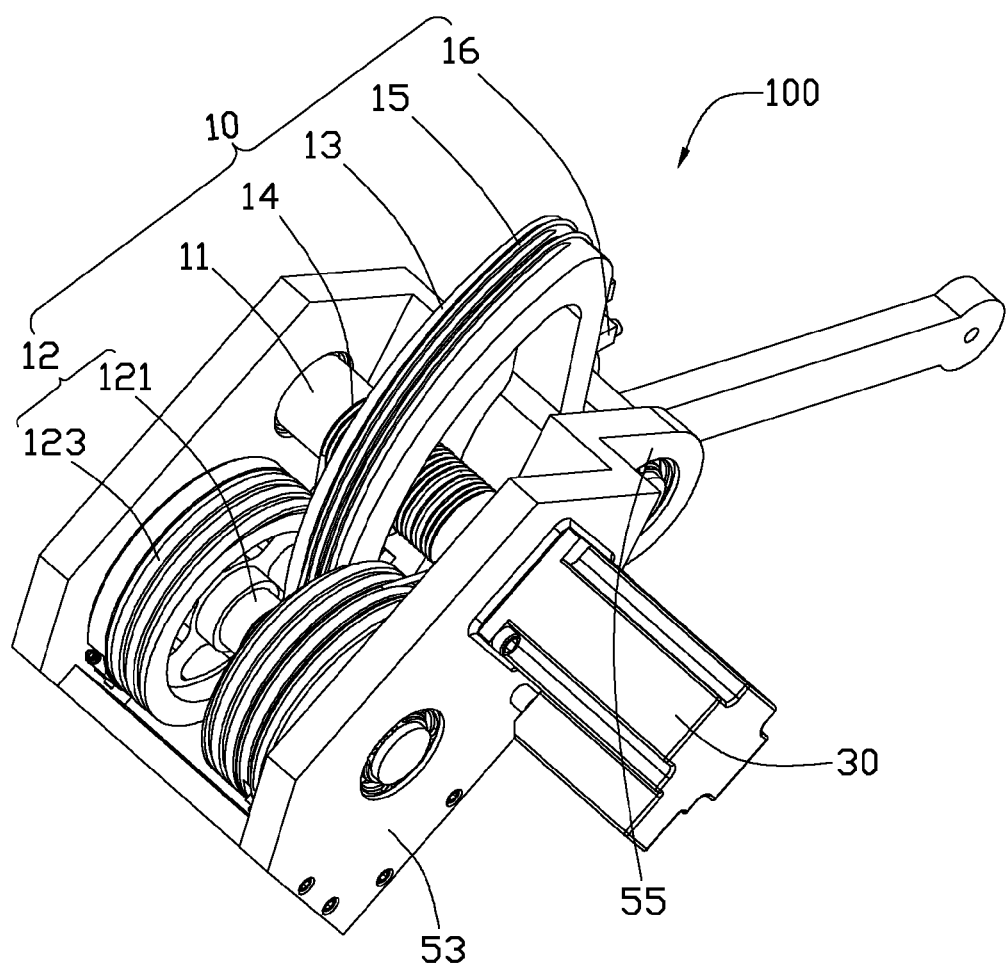
FIG. 4 is similar to FIG. 1, but shows a view from another aspect.
Figure 5:
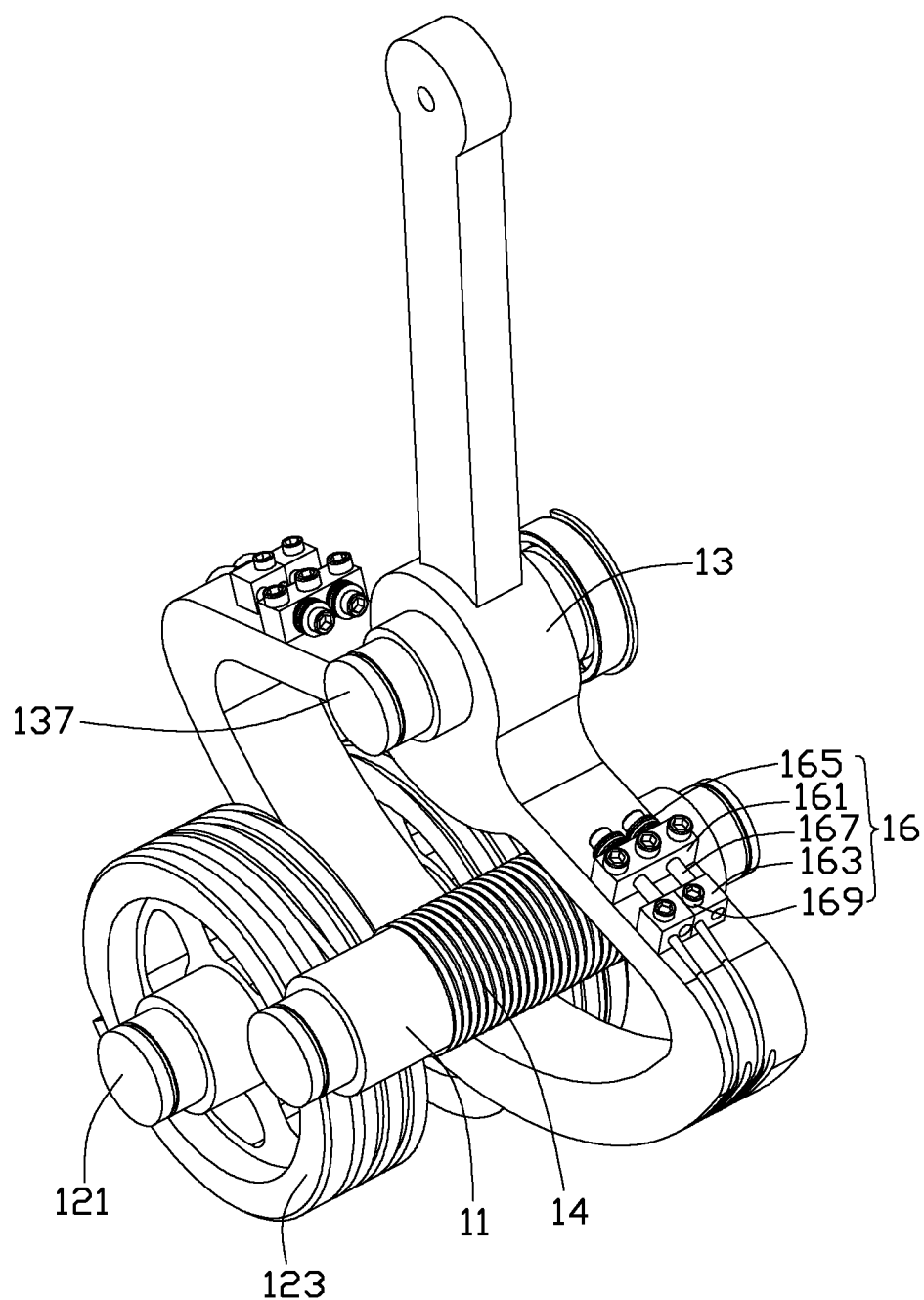
FIG. 5 is an assembled, isometric view of the transmission assembly of FIG. 3.

Referring to FIGS. 4 and 5, each fixing assembly 16 includes a positioning member 161, an adjustment member 163, a resilient member 165, a connecting rod 167, and a fastener 169. The resilient member 165 includes a plurality of dish-shaped spacers.

The driving device 30 is a motor, which includes a main body 31 and a rotating shaft (not shown) rotatably connected to the main body 31.

The bracket 50 includes a base plate 51, two side plates 53 extending substantially perpendicular to opposite edges of the base plate 51, and two connecting plates 55 extending from the middle of the base plate 51. The connecting plates 55 and the side plates 53 are arranged on opposite sides of the base plate 51, respectively.

Referring to FIGS. 1 through 5, during assembly of the deceleration mechanism 100, each end of the rotating shaft 137 of the second driven assembly 13 is rotatably received in one connecting plate 55 of the bracket 50. The main body 31 of the driving device 30 is fixed to one side plate 53 of the bracket 50. The driving member 11 extends through the through hole 135 of the second driven assembly 13. One end of the driving member 11 extends through the side plate 53 and is rotatably connected to the rotating shaft of the driving device 30, the other end of the driving member 11 extends through another side plate 53 and is rotatably connected to the other side plate 53. Opposite ends of the first driven assembly 12 extend through the side plate 53, and are rotatably connected to the side plates 53. Rotational axis of the driven shaft 121 of the first driven assembly 12 is substantially parallel to the rotational axis of the driving member 11. The first transmission member 14 forms a plurality of windings around the driving member 11, and each end of the first transmission member 14 coils around one driven wheel 123 of the first driven assembly 12 respectively, and extending into the receiving slots 125 of the driven wheels 123. Opposite ends of the first transmission member 14 are connected to the driven wheels 123 by two fixing assemblies 16. One positioning member 161 of one fixing assembly 16 is fixed on one driven wheel 123 by a fastener 169. The connecting rod 167 extends through the resilient member 165 and the adjustment member 163, and fixedly connects to the positioning member 161. One end of the first transmission member 14 is received in the adjustment member 163 and fixed by the fastener 169 engaging the adjustment member 163. The other fixing assembly 16 fixes the other end of the second transmission member 15 to the other driving wheel 123 as described. The second transmission member 15 comprising a plurality of coils winding around the driven shaft 121, located between the driven wheels 123 of the first driven assembly 12. Opposite ends of the second transmission member 15 extend into the interval receiving slots 1317 of the second driven assembly 13 and are fixed on the sidewalls 1313 of the second driven assembly 13 respectively by the fixing assemblies 16.

During operation of the deceleration mechanism 100, the driving device 30 rotates the driving member 11; in the illustrated embodiment, the driving member 11 rotates in an X direction, which is clockwise for example. When the driving member 11 rotates in the X direction, a portion of the first transmission member 14 coiled around the driving member 11 adjacent to the driven device 30 may be coiled into the receiving slot 125 of the driven wheel 123 adjacent to the driven device 30, and another portion of the first transmission member 14 away from the driving device 30 may be pulled out from the receiving slot 125 of another driven wheel 123. The first transmission member 14 rotates the first driven assembly 12 in a reverse direction to the X direction, a portion of the second transmission member 15 coiled around the driven shaft 121 of the first driven assembly 12 coils into one receiving slot 1317 of the second driven assembly 13, and another portion of the second transmission member 15 may be pulled out from one adjacent receiving slot 1317, thus, driving the second driven assembly 13 to rotate in the X direction. After the driving member 11 has rotated a number of default windings, the driving device 30 rotates the driving member 11 in a reverse direction to the X direction, and the first driven assembly 12 rotates in the X direction, the second driven assembly 13 rotates in a reverse direction to the X direction.

The first transmission member 14 and the second transmission member 15 are wire cables, therefore, there is no need for requiring a gear set or other complicated structures in the deceleration mechanism 100, such that the manufacturing cost is lower. The first transmission member 14 coils on the driving member 11 and the first driven assembly 12. The second transmission member 15 coils on the first driven assembly 12 and the second driven assembly 13, increasing friction between two contacting members thereof. Finally, the deceleration mechanism 100 provides higher transmission precision, better rigidity and steady transmission. The first driven assembly 12 is not only a driven component of the first stage transmission but also a driving component of the second stage transmission, simplifying the structure of the deceleration mechanism 100. In addition, the through hole 135 of the second driven assembly 13 can receive a portion of the driving member 11, thereby providing the deceleration mechanism 100 with more compact structure.

The first and second transmission members 14, 15 are maintained under tension by means of the elastic force of the resilient member 165. When the first and second transmission members 14, 15 becomes loosen, the connecting rod 167 is adjusted to bias the resilient member 165 such that the first and second transmission members 14, 15 are tensioned again.

Instead of having two driven wheels 123, one driven wheel 123 of the first driven assembly 12 may be deployed, with opposite ends of the first transmission member 14 fixed thereto. The windings of the receiving slot 125 may be increased correspondingly to achieve deceleration transmission.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A deceleration mechanism, comprising:
   a driving device; and
   a transmission assembly, comprising:
   a driving member connected to the driving device; and
   a first driven assembly;
   a second driven assembly;
   a first transmission member connecting the driving member to the first driven assembly, and driven by the driving device, and rotating the first driven assembly; and
   a second transmission member connecting the first driven assembly to the second driven assembly, and driven by the first driven assembly, and rotating the second driven assembly, wherein the second driven assembly comprises a transmission portion, the second transmission member coils on the first driven assembly, and opposite ends of the second transmission member are fixed on the transmission portion, the second driven assembly further defines a through hole extending through the transmission portion, the driving member extends through the through hole of the second transmission portion.

2. The deceleration mechanism of claim 1, wherein the rotational axis of the first driven assembly is substantially parallel to the rotational axis of the driving member.

3. The deceleration mechanism of claim 2, wherein the first driven assembly comprises a driven shaft and at least one driven wheel; wherein the first transmission member coils around the driving member, and opposite ends of the first transmission member coil on the at least one driven wheel.

4. The deceleration mechanism of claim 3, wherein the second transmission member coils on the driven shaft of the first driven assembly.

5. The deceleration mechanism of claim 1, wherein the transmission portion of the second driven assembly is substantially fan-shaped.

6. The deceleration mechanism of claim 3, wherein the at least one driven wheel comprises two driven wheels arranged around at the opposite ends of the driven shaft; the second transmission member coils on the driven shaft, between the driven wheels; and the first transmission member coils on the driving member, each end of the first transmission member winding around on one driven wheel.

7. The deceleration mechanism of claim 3, wherein the at least one driven wheel defines a receiving slot in which the first transmission member is coiled.

8. The deceleration mechanism of claim 7, wherein the receiving slot of the at least one driven wheel is a spiral slot comprising a plurality of windings; the first transmission member is coiled in parts of the windings of the receiving slot, and the number of windings of the receiving slot receiving the first transmission member is less than the number of the windings of the receiving slot remaining.

9. The deceleration mechanism of claim 1, wherein the transmission portion of the second driven assembly defines a receiving slot receiving a portion of the second transmission member.

10. The deceleration mechanism of claim 1, wherein the first transmission member and the second transmission member are wire cables.

11. The deceleration mechanism of claim 1, wherein the first transmission member and the second transmission member are steel coils.

12. The deceleration mechanism of claim 1, wherein the transmission assembly further comprises a plurality of fixing assemblies fixing the first transmission member to the first driven assembly and the second transmission member to the second driven assembly.

13. A deceleration mechanism, comprising:
a driving device; and
a transmission assembly, comprising:
  a driving member connected to the driving device;
  a first driven assembly;
  a second driven assembly;
  a first transmission member coiling around the driving member and the first driven assembly; and
  a second transmission member coiling around the first driven assembly and the second driven assembly, wherein the driving device rotates the driving member, the driving member rotates the first driven assembly, and the first driven assembly rotates the second driven assembly, the second driven assembly comprises a transmission portion, the second transmission member coils on the first driven assembly, and opposite ends of the second transmission member are fixed on the transmission portion, the second driven assembly further defines a through hole extending through the transmission portion, the driving member extends through the through hole of the second transmission portion.

14. The deceleration mechanism of claim 13, wherein the rotational axis of the first driven assembly is substantially parallel to the rotational axis of the driving member.

15. The deceleration mechanism of claim 14, wherein the first driven assembly comprises a driven shaft and at least one driven wheel arranged around the driven shaft; the first transmission member coils around the driving member, opposite ends of the first transmission member coil on the at least one driven wheel.

16. The deceleration mechanism of claim 15, wherein the second transmission member coils on the driven shaft of the first driven assembly.

17. The deceleration mechanism of claim 15, wherein the at least one driven wheel defines a receiving slot in which the first transmission member is coiled.

18. The deceleration mechanism of claim 17, wherein the receiving slot of the at least one driven wheel is a spiral slot comprising a plurality of windings; the first transmission member is coiled in parts of the windings of the receiving slot, and the number of windings of the receiving slot receiving the first transmission member is less than the number of the windings of the receiving slot remaining.

\* \* \* \* \*